US012769955B2

(12) United States Patent
Olson

(10) Patent No.: US 12,769,955 B2
(45) Date of Patent: Oct. 20, 2026

(54) CHARACTER CUSTOMIZATION USING TEXT-TO-IMAGE MOOD BOARDS AND LLMs

(71) Applicant: Sony Interactive Entertainment LLC, San Mateo, CA (US)

(72) Inventor: Joseph Logan Olson, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 136 days.

(21) Appl. No.: 18/623,975

(22) Filed: Apr. 1, 2024

(65) Prior Publication Data

US 2025/0307567 A1 Oct. 2, 2025

(51) Int. Cl.
*G06F 40/40* (2020.01)
*G06T 15/00* (2011.01)

(52) U.S. Cl.
CPC .............. *G06F 40/40* (2020.01); *G06T 15/00* (2013.01); *G06T 2200/24* (2013.01)

(58) Field of Classification Search
CPC ...... G06F 40/40; G06T 15/00; G06T 2200/24
See application file for complete search history.

(56) References Cited

U.S. PATENT DOCUMENTS 11,562,597 B1 * 1/2023 Kim ........................ G06T 13/40
11,769,017 B1 * 9/2023 Gray ........................ G06F 40/56 704/9
2012/0210203 A1 * 8/2012 Kandekar ............. G06F 16/345 715/230
2019/0304008 A1 * 10/2019 Cen ...................... G06N 3/0475
2020/0226474 A1 * 7/2020 Fidler ..................... G06N 3/045
2021/0082159 A1 * 3/2021 Shugrina ................. G06T 11/40
2021/0295822 A1 * 9/2021 Tomkins ............... G10L 15/197
2022/0189104 A1 * 6/2022 Wetzstein ................ G06N 3/09
2022/0237879 A1 * 7/2022 Wu ......................... G06T 15/04
2022/0383035 A1 * 12/2022 Saad ...................... G06V 10/56
2023/0012372 A1 * 1/2023 Saha ..................... G06V 20/647

(Continued)

OTHER PUBLICATIONS

Vimpari, Veera, et al. "An adapt-or-die type of situation: perception, adoption, and use of text-to-image-generation AI by game industry professionals." Proceedings of the ACM on Human-Computer Interaction 7.CHI Play (2023): 131-164. (Year: 2023).*

(Continued)

*Primary Examiner* — Anne L Thomas-Homescu
(74) *Attorney, Agent, or Firm* — Fish & Richardson P.C.

(57) ABSTRACT

Users generate one-of-a kind custom gear (a mask in one example) by selecting four images from a mood board that 'capture their vibe.' The images are generated using a text-to-image model, with the text used to generate those images being generated by an LLM. In this way, a list of "vibes" is generated, followed by descriptions of images that capture those vibes which are input to the text-to-image model to generate the images to create a moodboard menu content. Once a user selects four images, the selected images' text vibe/description are passed back to an LLM which (now in real-time) generates a unique "vibe" and literal description of the gear. This description is (in real-time) passed to a text-to-image generator to give the user a preview of the gear in 3D.

20 Claims, 4 Drawing Sheets

(56) References Cited

U.S. PATENT DOCUMENTS

| | | | | |
|---|---|---|---|---|
| 2023/0343333 | A1* | 10/2023 | Tunstall-Pedoe | G06F 16/3329 |
| 2025/0005859 | A1* | 1/2025 | Olson | G06T 15/08 |
| 2025/0307567 | A1* | 10/2025 | Olson | G06T 15/00 |
| 2025/0308092 | A1 | 10/2025 | Olson | |
| 2025/0308162 | A1 | 10/2025 | Olson | |

OTHER PUBLICATIONS

Qin, Jie, et al. "Diffusiongpt: Llm-driven text-to-image generation system." arXiv preprint arXiv:2401.10061 (2024). (Year: 2024).*
International Search Report and Written Opinion in International Appln. No. PCT/US2025/021851, mailed on Jun. 12, 2025, 10 pages.
Ding et al., "CogView: Mastering Text-to-Image Generation via Transformers," NIPS'21 Proceedings of the 35th International Conference on Neural Information Processing Systems, Dec. 6, 2021, 14 pages.
Hou et al., "Learning to Structure an Image with Few Colors," CoRR, Submitted on May 11, 2021, arXiv:2003.07848v2, 10 pages.
Liu et al., "Soft Rasterizer: A Differentiable Renderer for Image-based 3D Reasoning," CoRR, Submitted ono Apr. 3, 2019, arXiv:1904.01786v1, 15 pages.
Yoo et al., "GIFnets: Differentiable GIF Encoding Framework," 2020 IEEE/CVF Conference on Computer Vision and Pattern Recognition (CVPR), Jun. 2020, pp. 14473-14482.

* cited by examiner

CHARACTER CUSTOMIZATION USING TEXT-TO-IMAGE MOOD BOARDS AND LLMs

FIELD

The present application relates generally to character customization using text-to-image mood boards and large language models (LLMs).

BACKGROUND

The rise of text-to-image (as well as similar techniques like text-to-3D) has made many game developers desire a one-of-a-kind hyperpersonalized character customization (for example a mask or jacket that is only for one person). The first step is typically use of a textbox asking what the user wants the customization (such as a jacket) to look like.

SUMMARY

As understood herein, several problems with the above approach can arise. First, users may need help thinking of what they want in that they typically are not prepared to an idea "blue sky". Second, free-form text invites bad actors to request problematic content such as obscene images or copyright violations.

Furthermore, many user-generated content (UGC) interfaces may be based on pre-generated lists of content (enabling selection of an option in the list) but, until the advent of generative machine learning, two onerous requirements arise from this, namely, honoring every combination of choice (which can be a combinatorial explosion) and generating all of the options ahead of time. If the options are images, that can be a lot of art even just for a first playtest. Present techniques address the above challenges.

More specifically, using present techniques, users generate one-of-a kind custom gear (a mask in one example) by selecting four images from a mood board that 'captures their vibe.' Unbeknownst to the user, the images were generated using a text-to-image model such as SDXL. The text to generate those images may be generated by an LLM such as GPT4. Thus, first a list of "vibes" is generated, followed by descriptions of images that capture those vibes. Those image descriptions are fed, for example, to SDXL to generate the images. This all happens ahead of UGC creation to create content for a mood board menu. Once a user selects plural (e.g., four) images, the selected images' text vibe/description are passed back to an LLM which (now in real-time) generates a unique "vibe" and literal description of the gear. This description is (in real-time) passed to a text-to-image generator to give the user a preview of the gear in 3D.

Accordingly, a method includes generating text to describe plural themes using a first large language model (LLM) such as a generative pre-trained transformer, and inputting the text to a text-to-image model such as a stable diffusion model. The method also includes receiving from the text-to-image model plural images representing respective themes, presenting the plural images on a display, and receiving selection of at least some of the plural images presented on the display. The method includes inputting to the first LLM or to a second LLM selected images of the plural images presented on the display and receiving from the first LLM or second LLM a description of at least one object corresponding to one of the respective selected images. The description is input to a text-to-image generator to generate a preview image of the object.

In some examples, the method can further include receiving from the first LLM or a second LLM respective text describing respective themes, and inputting the text describing the themes to a text-to-image generator to generate a preview image of the first object.

The preview image of the first object may be in 3D.

In example embodiments the method can include presenting the preview image of the object on at least one display along with one or more selectors to select or discard the preview image.

In another aspect, a processor system is configured to receive a machine-generated list of themes, input the list of themes to an image generator, and generate plural images corresponding to each one of at least some of the list of themes for user selection.

In another aspect, a computer memory that is not a transitory signal includes instructions executable by at least one processor system for generating text to describe plural themes using a machine. The instructions are executable for using a machine for generating from the text plural images representing respective themes, presenting the plural images on a display, and receiving selection of at least some of the plural images presented on the display.

The details of the present application, both as to its structure and operation, can be best understood in reference to the accompanying drawings, in which like reference numerals refer to like parts, and in which:

DETAILED DESCRIPTION

Figure 1:
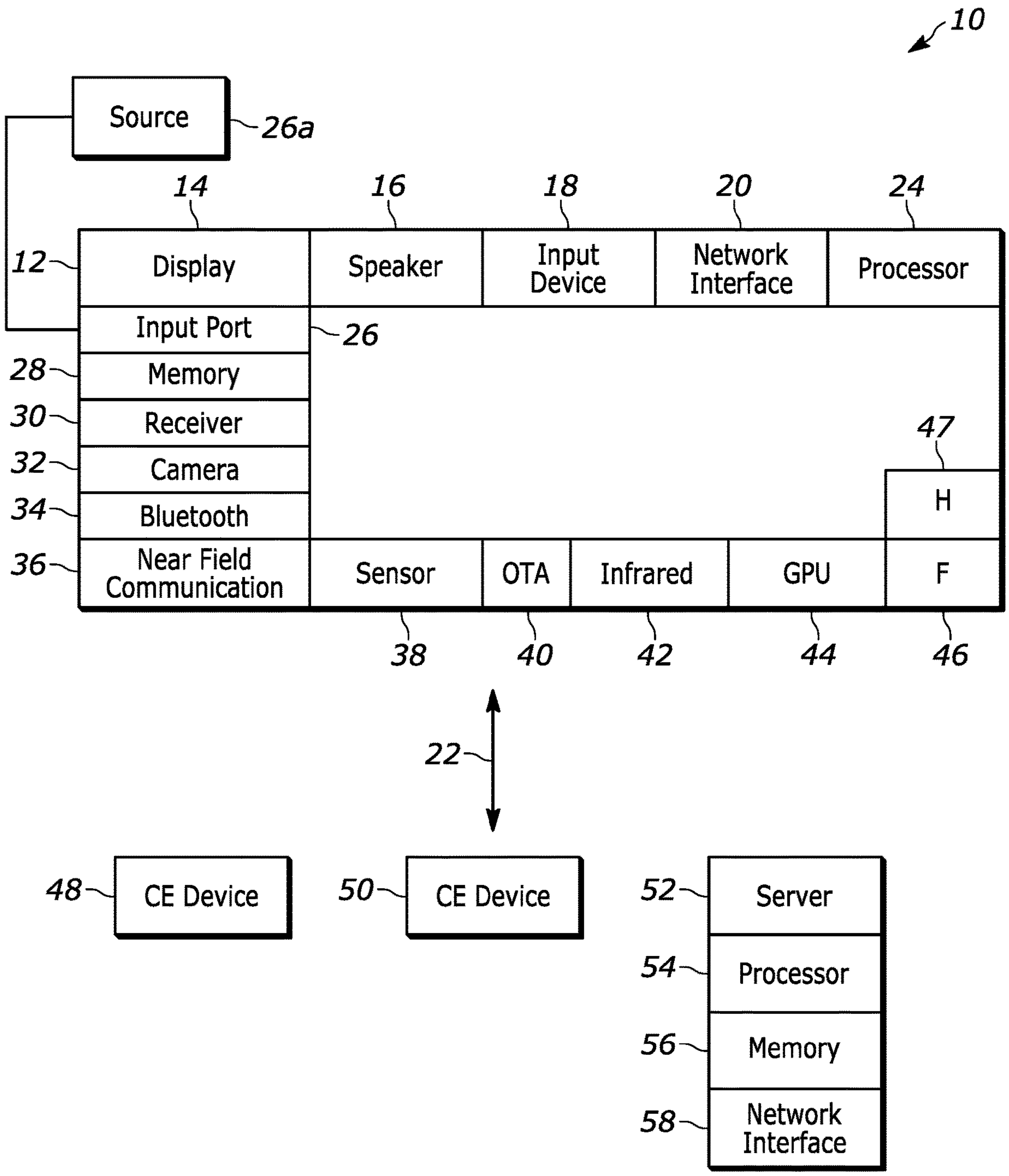
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

Figure 2:
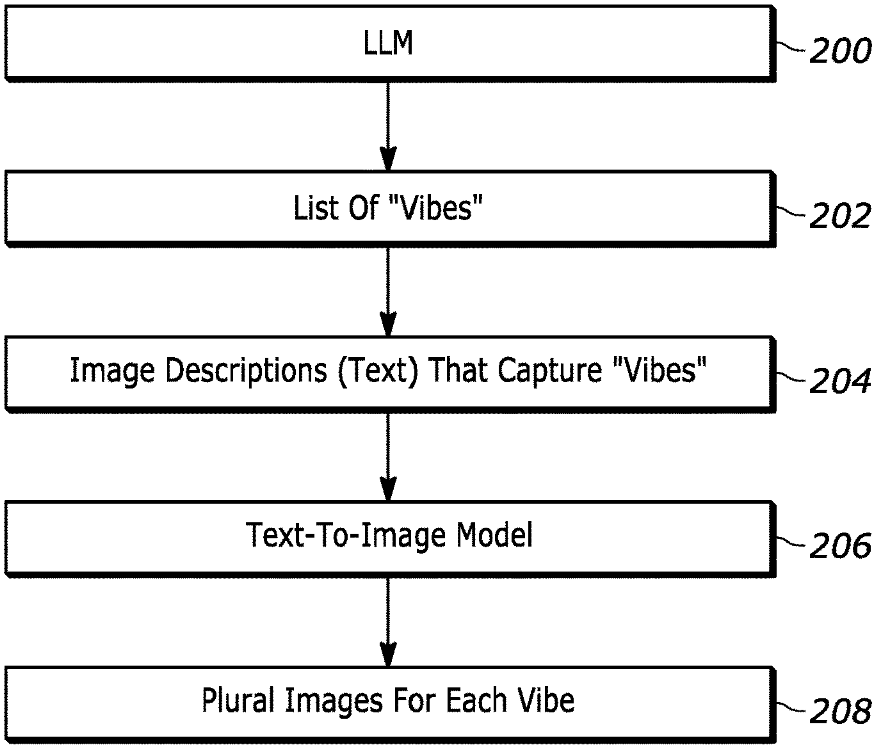
FIG. 2 illustrates an architecture for generating images of themes, referred to herein as "vibes"

Refer now to FIG. 2. A large language model (LLM) 200 such as a generative pre-trained transformer outputs a list of images of "vibes" 202. As used herein a "vibe" can essentially be a mood theme such as a gray moonlit night, a daytime colorful seascape, a happy party, etc. The list 202 is accompanied by text that describes the vibes. This information is sent to a text-to-image model 206 such as a stable diffusion model which outputs plural images 208 for each of the vibes.

Figure 3:
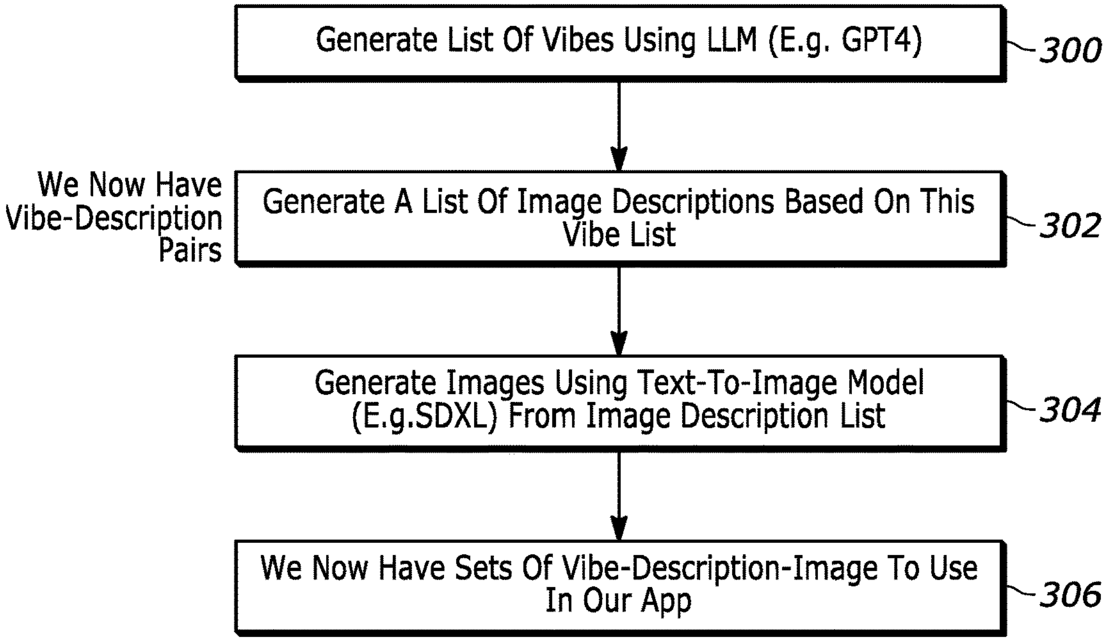
FIG. 3 illustrates example logic in example flow chart format consistent with FIG. 2.

FIG. 3 illustrates in flow chart format. Commencing at state 300, a list of vibes is generated using the LLM. The list can be in text format or image format. Moving to state 302, a list of image descriptions is also generated based on the vibe list. Proceeding to state 304, from the image description list images are generated by the text-to-image model to produce sets at state 306 of vibe descriptions and corresponding images.

An illustration of how an LLM can take four vibes and generate an image description is shown in the code below of a "fill-in-the-blank" prompt:

```
example_input = [{
 "name" : "Industrial",
 "description" : "A black and white photograph of a factory with pipes, machinery, and metal
beams."
},
}
 "name" : "Furry",
 "description" : "A photograph of a furry costume inspired by an animal or fantasy creature on
a wooden chair."
}]
example_output = "A gritty fox mask covered in grease and soot"
class Prompt( ):
   def generate(self,data):
      q_base = "Please generate a short description for one mask that captures these themes: "
      example_question = q_base + ", ".join([f'{value['name']}" for index, value in
enumerate(example_input)])
      new_question = q_base + ", ".join([f'{ value['name']}" for index, value in
enumerate(data)])
      SYSTEM_MESSAGE = "You are a world-class mask designer. You are helpful,
creative, and concise."
      messages=[
         {"role": "system", "content": SYSTEM_MESSAGE},
         {"role": "user", "content": example_question},
         { "role": "assistant", "content": example_output},
         {"role": "user", "content": new_question}
       ]
      response = openai.ChatCompletion.create(
        engine=DEPLOYMENT_NAME,
        messages=messages,
            )
```

Figure 4:
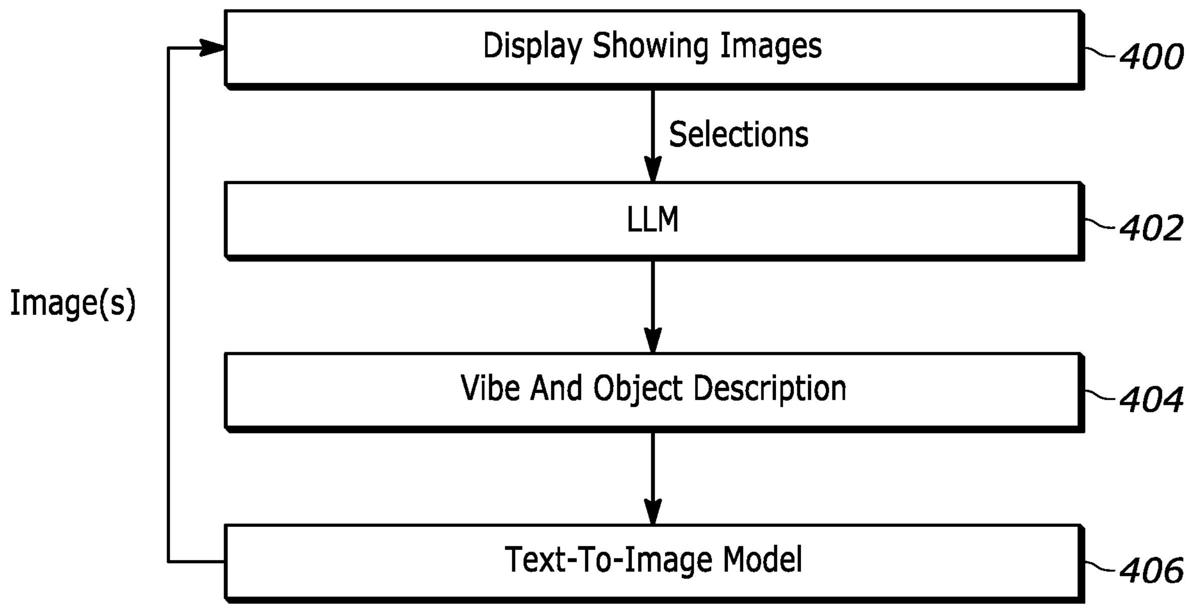
FIG. 4 illustrates an architecture for generating images of objects such as masks corresponding to selected themes.
Figure 5:
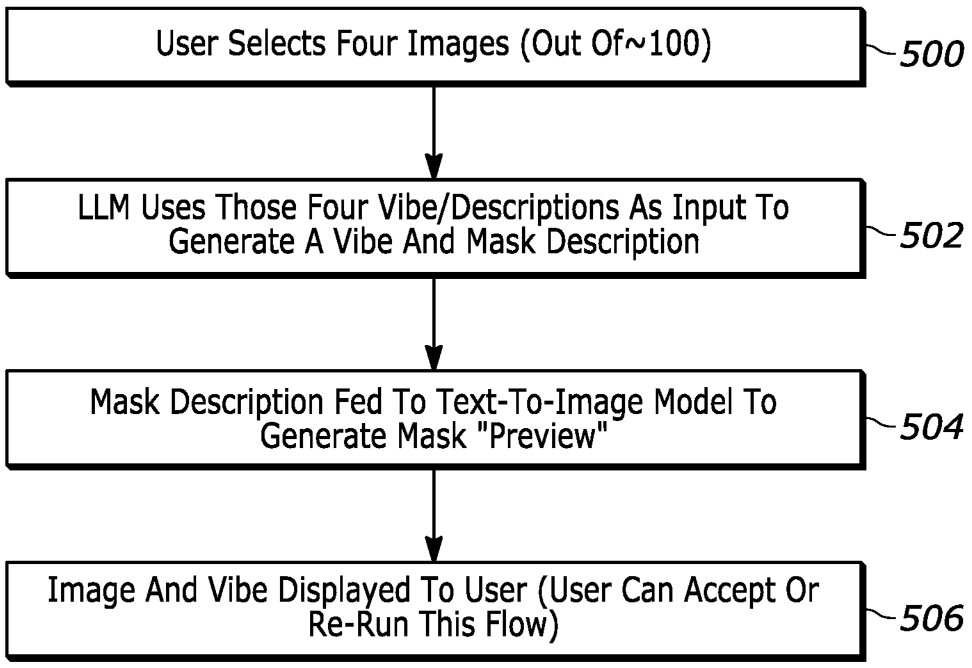
FIG. 5 illustrates example logic in example flow chart format consistent with FIG. 4.

Once the vibes are generated, FIGS. 4 and 5 illustrate their use. A display 400 shows images capturing the vibes as output at state 306 in FIG. 3. A user can select one or more of the images, e.g., four, and the selections are sent to an LLM 402 which may be the same as or different from the LLM 200 shown in FIG. 2. The LLM 402 outputs vibe and object text descriptions 404 which are sent to a text-to-image model 406 which may be the same as or different from the text-to-image model 206 shown in FIG. 2. In response, the model 406 outputs one or more preview images which are presented on the display 400.

FIG. 5 illustrates further. At state 500 a user selects plural images from the many images presented on the display 400, such as four selections out of one hundred images presented. The selections are sent at state 502 to the LLM which in response generates vibe and object descriptions. In an example, the objects being described are masks, and their description fits the description of the accompanying vibe. Moving to state 504, the object descriptions are sent to the text-to-image generator to generate object previews for presentations of the previews along with images representing the respective vibes on the display 400 at state 506.

Figure 6:
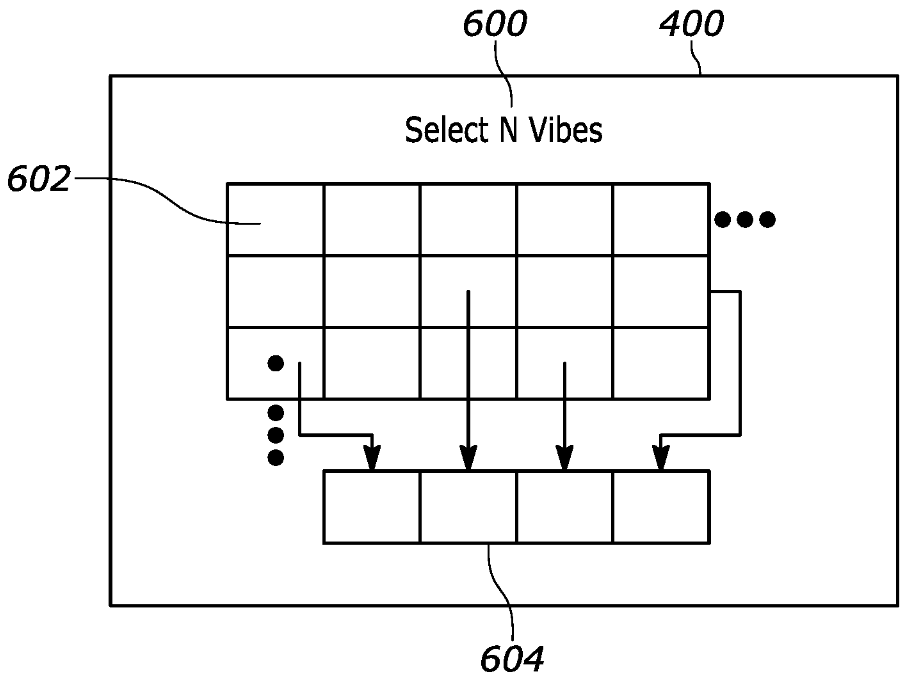
FIG. 6 illustrates an example screen shot of an example presentation of selectable theme images.

FIG. 6 illustrates an example of the selection screen that can be presented on the display 400 after state 306 in FIG. 3. A prompt 600 can be presented to select one or more vibes by clicking on images 602, each representing its own vibe. As the user clicks on the selections they are moved down to a shortened list of images 604.

Figure 7:
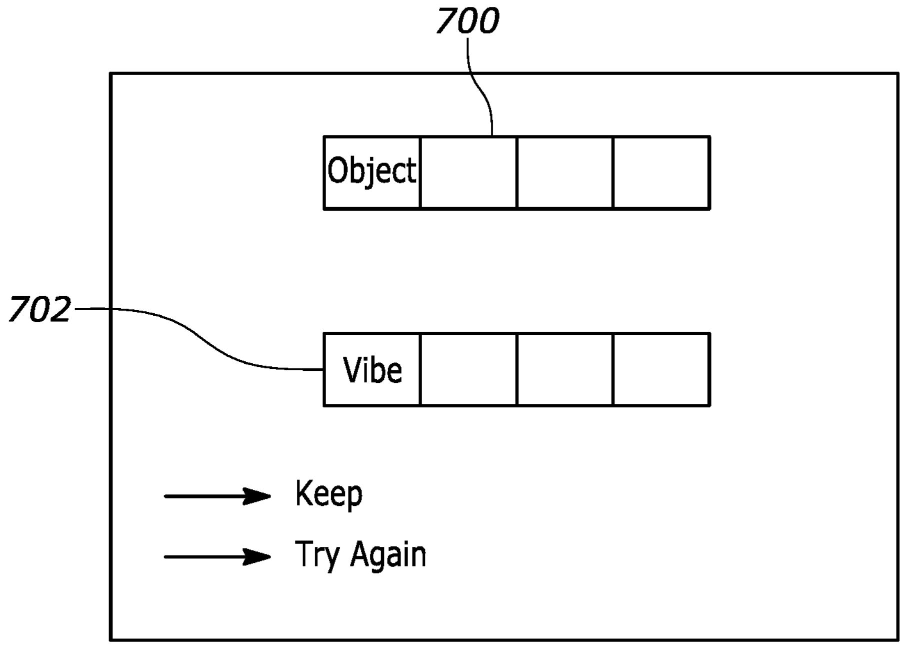
FIG. 7 illustrates an example screen shot of an example presentation of one or more objects corresponding to the selected themes.

FIG. 7 illustrates an example of the preview screen that can be presented on the display 400 at state 506 in FIG. 5. A row 700 of images of objects fitting the selected vibe or vibes, such as four images is presented. Also, a row 702 of images of the selected vibe or vibes, such as four images, is presented so that the user can easily correlate object images with respective vibe images, which are registered with each other through the rows 700, 702. In a non-limiting embodiment, FIG. 7 illustrates four views of the same image such as a mask for a single vibe. The lower row of images are images the user has selected just to help the user remember.

While the particular embodiments are herein shown and described in detail, it is to be understood that the subject matter which is encompassed by the present invention is limited only by the claims.

What is claimed is:

1. A method for generating customized virtual equipment in a video game, comprising:

generating, using a first large language model (LLM), text data;

generating, using a text-to-image model processing the generated text data, a set of images representing respective themes;

presenting the generated set of images on a display;

receiving a selection of one or more images from the generated set of images presented on the display;

generating, using the first LLM or a second LLM that processes the received selection, a description of virtual equipment in a video game; and generating, based on output of the text-to-image model processing the generated description of the virtual equipment in the video game, a view of the virtual equipment in the video game.

2. The method of claim 1, comprising:

inputting, to the first LLM, selected images of the received selection from the generated set of images presented on the display; and receiving, from the first LLM, the description of the virtual equipment in the video game.

3. The method of claim 1, comprising:

inputting, to the second LLM, selected images of the received selection from the generated set of images presented on the display; and receiving, from the second LLM, the description of the virtual equipment in the video game.

4. The method of claim 1, wherein the first LLM comprises a generative pre-trained transformer.

5. The method of claim 1, wherein the text-to-image model comprises a stable diffusion model.

6. The method of claim 1, comprising:

receiving, from the first LLM or the second LLM, respective text describing respective themes; and inputting the text describing the themes to a text-to-image generator of the text-to-image model to generate a preview image of the virtual equipment in the video game.

7. The method of claim 6, wherein the preview image of the virtual equipment in the video game is rendered in three-dimensions.

8. The method of claim 1, comprising presenting the view of the virtual equipment in the video game on at least one display along with one or more selectors to select or discard the view.

9. The method of claim 1, wherein generating the description of the virtual equipment in the video game using the received selection comprises:

generating text data using both (i) the one or more images selected from the generated set of images and (ii) a description of each of the one or more images selected from the generated set of images.

10. One or more non-transitory computer storage media encoded with computer program instructions that when executed by one or more computers cause the one or more computers to perform operations comprising:

generating, using a first large language model (LLM), text data;

generating, using a text-to-image model processing the generated text data, a set of images representing respective themes;

presenting the generated set of images on a display;

receiving a selection of one or more images from the generated set of images presented on the display;

generating, using the first LLM or a second LLM that processes the received selection, a description of virtual equipment in a video game; and generating, based on output of the text-to-image model processing the generated description of the virtual equipment in the video game, a view of the virtual equipment in the video game.

11. The media of claim 10, wherein the operations comprise:

inputting, to the first LLM, selected images of the received selection from the generated set of images presented on the display; and receiving, from the first LLM, the description of the virtual equipment in the video game.

12. The media of claim 10, wherein the operations comprise:

inputting, to the second LLM, selected images of the received selection from the generated set of images presented on the display; and receiving, from the second LLM, the description of the virtual equipment in the video game.

13. The media of claim 10, wherein the first LLM comprises a generative pre-trained transformer.

14. The media of claim 10, wherein the text-to-image model comprises a stable diffusion model.

15. A system comprising:

one or more computers and one or more storage devices on which are stored instructions that are operable, when executed by the one or more computers, to cause the one or more computers to perform operations comprising:

generating, using a first large language model (LLM), text data;

generating, using a text-to-image model processing the generated text data, a set of images representing respective themes;

presenting the generated set of images on a display;

receiving a selection of one or more images from the generated set of images presented on the display;

generating, using the first LLM or a second LLM that processes the received selection, a description of virtual equipment in a video game; and generating, based on output of the text-to-image model processing the generated description of the virtual equipment in the video game, a view of the virtual equipment in the video game.

16. The system of claim 15, wherein the operations comprise:

receiving, from the first LLM or the second LLM, respective text describing respective themes; and inputting the text describing the themes to a text-to-image generator of the text-to-image model to generate a preview image of the virtual equipment in the video game.

17. The system of claim 16, wherein the preview image of the virtual equipment in the video game is rendered in three-dimensions.

18. The system of claim 15, comprising presenting the view of the virtual equipment in the video game on at least one display along with one or more selectors to select or discard the view.

19. The system of claim 15, wherein generating the description of the virtual equipment in the video game using the received selection comprises:

generating text data using both (i) the one or more images selected from the generated set of images and (ii) a description of each of the one or more images selected from the generated set of images.

20. The system of claim 15, wherein the operations comprise:

inputting, to the first LLM, selected images of the received selection from the generated set of images presented on the display; and receiving, from the first LLM, the description of the virtual equipment in the video game.

* * * * *